(12) United States Patent
Meng

(10) Patent No.: US 12,045,635 B2
(45) Date of Patent: Jul. 23, 2024

(54) MULTI-TASK OPERATION METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Wanting Meng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/810,176

(22) Filed: Jun. 30, 2022

(65) Prior Publication Data

US 2022/0334855 A1 Oct. 20, 2022

Related U.S. Application Data

(63) Continuation of application No. PCT/CN2021/072922, filed on Jan. 20, 2021.

(30) Foreign Application Priority Data

Mar. 17, 2020 (CN) .......................... 202010188525.8

(51) Int. Cl.
  *G06F 9/451* (2018.01)
  *G06F 3/04817* (2022.01)
  (Continued)

(52) U.S. Cl.
  CPC .......... *G06F 9/451* (2018.02); *G06F 3/04817* (2013.01); *G06F 3/04842* (2013.01); *G06F 3/0486* (2013.01); *G06F 3/0488* (2013.01)

(58) Field of Classification Search
  CPC .. G06F 9/451; G06F 3/04817; G06F 3/04842; G06F 3/0486; G06F 3/0488;
  (Continued)

(56) References Cited

U.S. PATENT DOCUMENTS 10,551,995 B1  2/2020  Ho et al.
2010/0299597 A1  11/2010  Shin et al.
(Continued)

FOREIGN PATENT DOCUMENTS

CN   103809845   5/2014
CN   105763716   7/2016
(Continued)

OTHER PUBLICATIONS

CNIPA, First Office Action for CN Application No. 202010188525. 8, Dec. 30, 2022.
(Continued)

*Primary Examiner* — Pei Yong Weng
(74) *Attorney, Agent, or Firm* — Hodgson Russ LLP

(57) ABSTRACT

A multi-task operation method, an electronic device and a storage medium are provided. A multi-task interface is displayed by the electronic device; a window corresponding to a first application is displayed in a floating manner in response to an operation acting on the window; and an interface of a second application is displayed in response to an operation of triggering a startup of the second application, the window is displayed on the interface in the floating manner. By means of the operation acting on the window on the multi-task interface and the operation of triggering the startup of the second application, the interface is displayed, and the window is displayed on the interface in the floating manner, thereby realizing fast displaying of other windows on a window in a floating manner.

17 Claims, 12 Drawing Sheets

(51) Int. Cl.
   *G06F 3/04842*     (2022.01)
   *G06F 3/0486*      (2013.01)
   *G06F 3/0488*      (2022.01)

(58) Field of Classification Search
   CPC .. G06F 3/0481; G06F 3/0482; G06F 3/04883;
                                          G06F 9/485
   See application file for complete search history.

(56) References Cited

U.S. PATENT DOCUMENTS

| | | | | |
|---|---|---|---|---|
| 2012/0084719 | A1* | 4/2012 | Sirpal | G06F 3/0481 715/799 |
| 2014/0089833 | A1* | 3/2014 | Hwang | G06F 3/04817 715/780 |
| 2014/0237420 | A1* | 8/2014 | Song | G06F 3/04817 715/788 |
| 2014/0331174 | A1 | 11/2014 | Wen et al. | |
| 2014/0351748 | A1 | 11/2014 | Xia et al. | |
| 2017/0195613 | A1* | 7/2017 | Yang | H04N 5/268 |

FOREIGN PATENT DOCUMENTS

| | | |
|---|---|---|
| CN | 106020592 | 10/2016 |
| CN | 106126236 | 11/2016 |
| CN | 106537319 | 3/2017 |
| CN | 106843654 | 6/2017 |
| CN | 106844067 | 6/2017 |
| CN | 107037949 | 8/2017 |
| CN | 107357515 | 11/2017 |
| CN | 108170333 | 6/2018 |
| CN | 108170342 | 6/2018 |
| CN | 109165076 | 1/2019 |
| CN | 109521923 | 3/2019 |
| CN | 109582189 | 4/2019 |
| CN | 109933386 | 6/2019 |
| CN | 110243386 | 9/2019 |
| CN | 110489043 | 11/2019 |
| CN | 110568990 | 12/2019 |
| CN | 111399959 | 7/2020 |
| WO | 2019174465 | 9/2019 |
| WO | 2019174546 | 9/2019 |

OTHER PUBLICATIONS

WIPO, International Search Report and Written Opinion for PCT/CN2021/072922, Mar. 24, 2021.
CNIPA, Second Office Action for CN Application No. 202010188525.8, Jul. 22, 2023.
EPO, Extended European Search Report for EP Application No. 21772328.7, Aug. 17, 2023.
CNIPA, Third Office Action for CN Application No. 202010188525.8, Mar. 7, 2024.

* cited by examiner

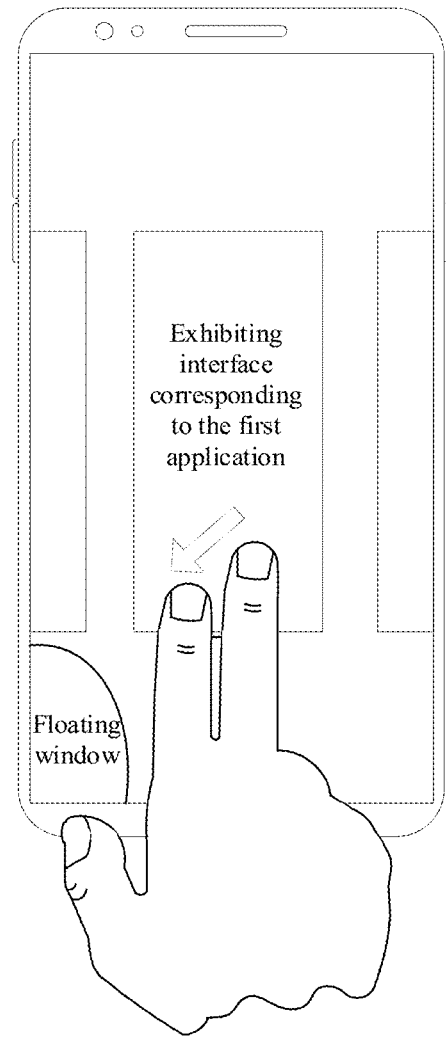

FIG. 9

| | |
|---|---|
| a moving direction and a moving distance of the window corresponding to the first application are obtained during the window corresponding to the first application is moved on the current interface | S241 |
| the specified area is exhibited on the current interface in response to the moving direction and the moving distance of the window corresponding to the first application meet specified conditions | S242 |

FIG. 10 a specified prompt is displayed in the specified area in response to the window corresponding to the first application is moved to the specified area — S251 the window corresponding to the first application is displayed on the current interface in the floating manner in response to a third operation corresponding to the specified prompt is detected — S252

| the interface of the second application is displayed on the current interface in response to a click operation acting on an application icon corresponding to the second application, and the window corresponding to the first application is displayed on the interface of the second application in the floating manner | S261 |

FIG. 13A

| the interface of the second application is displayed on the current interface in response to a click operation acting on the window corresponding to the second application, and the window corresponding to the first application is displayed on the interface of the second application in the floating manner | S262 |

FIG. 13B

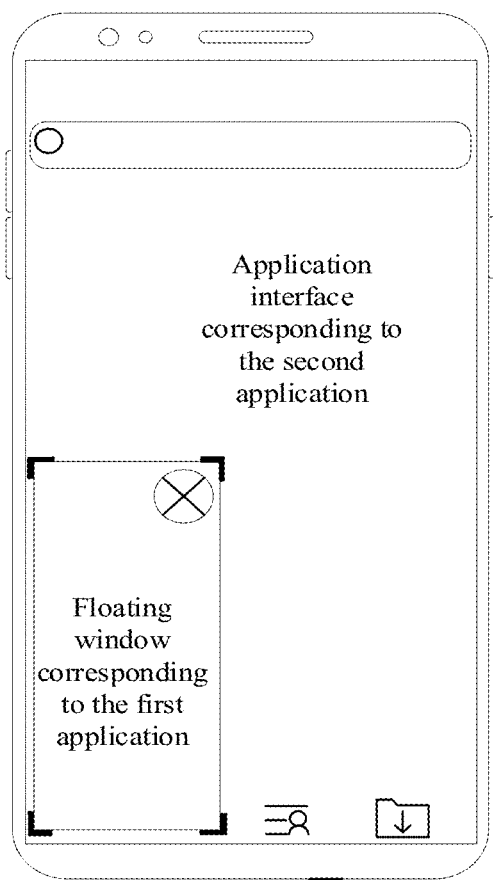

FIG. 14

MULTI-TASK OPERATION METHOD, ELECTRONIC DEVICE, AND STORAGE MEDIUM

CROSS-REFERENCE TO RELATED APPLICATIONS

The present disclosure is a continuation of International Application No. PCT/CN2021/072922, filed Jan. 20, 2021, which claims priority to Chinese Patent Application No. 202010188525.8, filed Mar. 17, 2020, the entire disclosures of which are incorporated herein by reference.

TECHNICAL FIELD

The present disclosure relates to the field of electronic device technologies, and in particularly, to a multi-task operation method, an electronic device, and a storage medium.

BACKGROUND

With rapid development of electronic device technologies, users have higher and higher demands for multiple applications running at the same time. At present, if an electronic device wants to run another application (shorted as App) while running an application for the user to operate, the electronic device needs to suspend a relevant operation of the currently running application or close a window of the currently running application before switching to a window of another application.

SUMMARY

In view of the above problems, the present disclosure provides a multi-task operation method, an electronic device, and a storage medium.

In a first aspect, an embodiment of the present disclosure provides a multi-task operation method, implemented by an electronic device, and the method includes: a multi-task interface being displayed by the electronic device, the multi-task interface including windows corresponding to applications in background, the multi-task interface being configured to display at least one of the windows corresponding to at least one of the applications, and the at least one of the applications including a first application; the window corresponding to the first application being displayed in a floating manner in response to a first operation acting on the window corresponding to the first application; and an interface of a second application being displayed in response to a second operation of triggering a startup of the second application, and the window corresponding to the first application being displaying on the interface of the second application in the floating manner.

In a second aspect, an embodiment of the present disclosure provides an electronic device, including: a processor and a memory. The memory is coupled to the processor, the memory is stored with instructions, and the processor is configured to, when the instructions are executed by the processor, implement the above method.

In a third aspect, an embodiment of the present disclosure provides a non-transitory computer-readable storage medium, the non-transitory computer-readable storage medium is stored with program instructions therein, the program instructions are callable by a processor to implement the above method.

BRIEF DESCRIPTION OF THE DRAWINGS

In order to explain technical solutions in embodiments of the present disclosure more clearly, the drawings needed in the description of the embodiments will be briefly introduced below. It is obvious that the drawings in the following description are only some embodiments of the present disclosure. For those of ordinary skill in the art, other drawings can be obtained according to these drawings without paying creative work.

FIG. 9 illustrates a schematic view of even still another interface of the electronic device according to an embodiment of the present disclosure.

FIG. 10 illustrates a schematic flowchart of block S240 of the multi-task operation method illustrated in FIG. 5 according to an embodiment of the present disclosure.

FIG. 13A illustrates a schematic flowchart of block S260 of the multi-task operation method illustrated in FIG. 5 according to an embodiment of the present disclosure.

FIG. 13B illustrates another schematic flowchart of block S260 of the multi-task operation method illustrated in FIG. 5 according to an embodiment of the present disclosure.

FIG. 14 illustrates a schematic view of even further another interface of the electronic device according to an embodiment of the present disclosure.

DETAILED DESCRIPTION OF EMBODIMENTS

In order to enable those of ordinary skill in the art to better understand the technical solutions of the present disclosure, the technical solutions in embodiments of the present disclosure will be clearly and completely described below in combination with accompanying drawings in the embodiments of the present disclosure.

If an electronic device wants to run another application while running an application for a user to operate, the electronic device needs to suspend a relevant operation of the currently running application or close a window of the currently running application before switching to a window of another application. For example, when a user is watching a video and needs to chat with a friend, the user needs to suspend the currently playing video before switching to a chat interface. Therefore, it is necessary to switch back and forth between windows of applications, which brings inconvenience to the user to operate. In order to solve the above technical problems, more and more electronic device manufacturers open a split screen function on an electronic device to display two different applications on two different screens, thereby to solve demands of users who need to use two applications at the same time. However, after a long-term research, inventor found that the current split screen function is only applicable to a scene of operating two applications at the same time, but subdividing user scenes, for example, when it is necessary to refer to information of one application and operate in another application, the information of the referenced application is only used as a reference, there is no actual interaction demand, the split screen function is of little use, although a proportion of the two screens formed by the split screen function can be adjusted, and an adjustment range is limited.

In view of the above problems, the inventor has found through the long-term research and proposed a multi-task operation method and a multi-task operation apparatus, an electronic device and a storage medium provided by embodiments of the present disclosure. Through a first operation acting on a window of a first application in a multi-task interface and a second operation of triggering a startup of a second application, an interface of the second application is displayed on a current interface, and the window corresponding to the first application is displayed on the interface of the second application in a floating manner, and thereby to quickly display other windows on a window in a floating manner to meet user needs. The specific multi-task operation method will be described in detail in subsequent embodiments.

Figure 1:
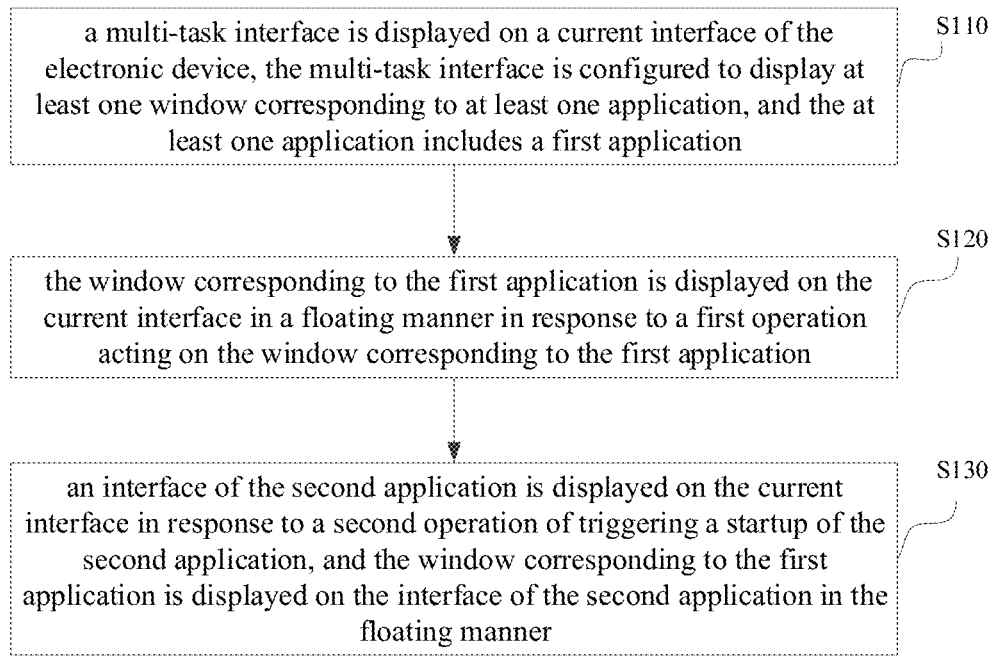
FIG. 1 illustrates a schematic flowchart of a multi-task operation method according to an embodiment of the present disclosure.

Please refer to FIG. 1, which illustrates a schematic flowchart of a multi-task operation method according to an embodiment of the present disclosure. The multi-task operation method is used to display an interface of a second application on a current interface and display a window corresponding to a first application on the interface of to the second application in a floating manner through a first operation acting on the window of the first application in a multi-task interface and a second operation of triggering a startup of the second application, and thereby to quickly display other windows on a window in a floating manner to meet the user needs. In an illustrated embodiment, the multi-task operation method is implemented by a multi-task operation apparatus 200 illustrated in FIG. 16 or an electronic device 100 configured with the multi-task operation apparatus 200 (as illustrated in FIG. 17). The following will take the electronic device as an example to illustrate a specific process of this embodiment. Of course, it is understandable that the electronic devices applied in this embodiment can be mobile terminals, smart phones, tablets, wearable electronic devices, etc., which are not limited here. The process illustrated in FIG. 1 will be described in detail below. The multi-task operation method may begin from block S110 to block S130.

At the block S110, a multi-task interface is displayed on a current interface of the electronic device, the multi-task interface is configured to display at least one window corresponding to at least one application, and the at least one application includes a first application.

In the embodiment, the current interface of the electronic device can display the multi-task interface, the multi-task interface can be configured to display the at least one window respectively corresponding to the at least one application, and the at least one application includes the first application.

In some embodiments, the at least one application may further include a second application, a third application, a fourth application, . . . ; and the at least one window may accordingly further include a window corresponding to the second application, a window corresponding to the third application, a window corresponding to the fourth application, without limitation here.

In some embodiments, when the electronic device displays the multi-task interface, an application running in a background of the electronic device can be obtained, and a window corresponding to the application running in the background of the electronic device can be displayed in the multi-task interface.

In some embodiments, when the electronic device displays the multi-task interface, an application running in a background of the electronic device can be obtained, and a window displaying a first content of the application when it is switched from a foreground to the background can be obtained, and the window displaying the first content is taken as a window corresponding to the application, and the window corresponding to the application running in the background of the electronic device is displayed on the multi-task interface.

In some embodiments, the electronic device can display the multi-task interface on the current interface according to a multi-task interface display instruction. The electronic device can display, in response to a sliding operation on a touch screen meeting a preset condition, the multi-task interface on the current interface. For example, the electronic device can display, in response to a sliding operation with a starting point at a bottom of a touch screen and with a sliding direction parallel to an axial direction of the touch screen, the multi-task interface on the current interface. In an illustrated embodiment, the electronic device can display, in response to a pressing operation on a physical key and meeting a specified condition, the multi-task interface on the current interface. There are no limitations here.

In some embodiments, when the multi-task interface includes windows corresponding to applications, the at least one window corresponding to the at least one application among the windows can be displayed on the current interface, and the windows corresponding to the others of the applications can be hidden. The windows corresponding to the applications can be switched between states of displaying and hiding based on a sliding operation acting on the current interface. For example, suppose that the multi-task interface includes windows respectively corresponding to an application 1, an application 2 and an application 3. When the window corresponding to the application 1 is displayed on the current interface, the windows corresponding to the application 2 and the application 3 can be hidden. In response to a sliding operation acting on the current interface is detected, the window corresponding to the application 1 can be switched from displaying to hiding, the window corresponding to the application 2 can be switched from hiding to displaying, and the window corresponding to the application 3 can be kept hide.

Figure 2:
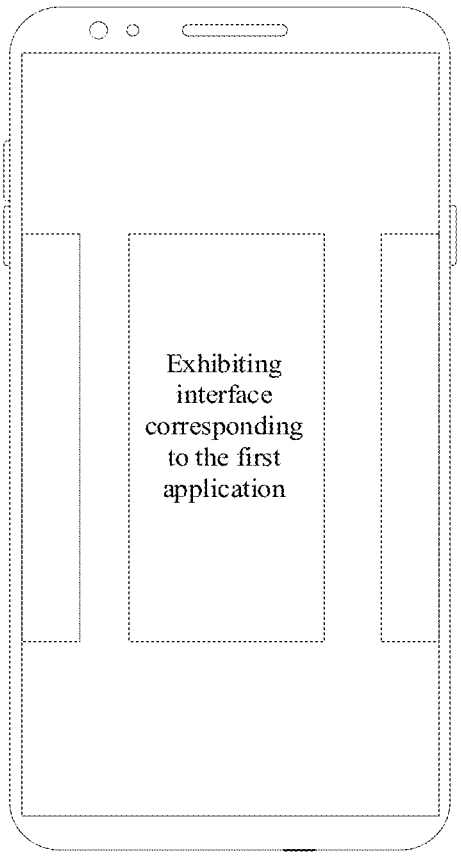
FIG. 2 illustrates a schematic view of an interface of an electronic device according to an embodiment of the present disclosure.

Please refer to FIG. 2, which illustrates a schematic view of an interface of an electronic device according to an embodiment of the present disclosure. As illustrated in FIG. 2, a current interface of the electronic device displays a multi-task interface, and a window corresponding to one application is displayed on the multi-task interface, and windows corresponding to other applications are completely or partially hidden.

At the block S120, the window corresponding to the first application is displayed on the current interface in a floating manner in response to a first operation acting on the window corresponding to the first application.

In this embodiment, the first application can be any one of the at least one application included in the multi-task interface, the first operation can be performed on the first application displayed on the current interface in response to an application displayed on the current interface is determined as the first application, a window corresponding to another application can be switched and displayed on the current interface until the application corresponding to the window displayed on the current interface is determined as the first application in response to the application displayed on the current interface is determined as not the first application. When the operation acting on the window corresponding to the first application is detected as the first operation, the window corresponding to the first application can be displayed on the current interface in a floating manner in response to the first operation acting on the window corresponding to the first application.

In some embodiments, during the multi-task interface is displayed on the current interface of the electronic device, an operation acting on the window corresponding to the at least one application displayed on the multi-task interface can be detected. When the first operation acting on the window corresponding to the first application is detected, the window corresponding to the first application can be generated and displayed on the current interface in a floating manner in response to the first operation. The first operation can be set in advance and stored locally in the electronic device, and the first operation is used as a judgment basis for an operation acting on the window corresponding to the first application. Therefore, in this embodiment, when the operation acting on the window corresponding to the first application is detected, it can be judged whether the operation acting on the window corresponding to the first application is the first operation, when the judgment result indicates that the operation acting on the window corresponding to the first application is the first operation, the window corresponding to the first application can be displayed on the current interface in a floating manner in response to the first operation acting on the window corresponding to the first application. When the judgment result indicates that the operation acting on the window corresponding to the first application is not the first operation, it cannot response to the operation.

Figure 3:
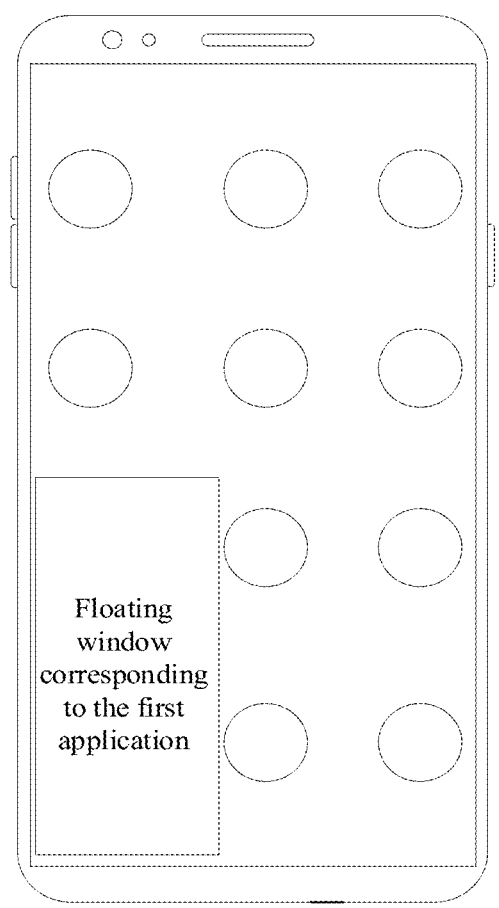
FIG. 3 illustrates a schematic view of another interface of the electronic device according to an embodiment of the present disclosure.

Please refer to FIG. 3, which illustrates a schematic view of another interface of the electronic device according to an embodiment of the present disclosure. As illustrated in FIG. 3, the current interface of the electronic device displays the window corresponding to the first application. At this time, the current interface of the electronic device, except the window corresponding to the first application, can display a system desktop (circles displayed in an interface of FIG. 3 represent application icons corresponding to applications respectively), and the multi-task interface, etc., which is not limited here.

At the block S130, an interface of the second application is displayed on the current interface in response to a second operation of triggering a startup of the second application, and the window corresponding to the first application is displayed on the interface of the second application in the floating manner.

In this embodiment, the second application can be any one of applications installed in the electronic device. When the second operation of triggering the startup of the second application is detected, the interface of the second application can be displayed on the current interface in response to the second operation of triggering the startup of the second application, the window corresponding to the first application is floatingly displayed on the interface of the second application, therefore the first application can be displayed on the interface of the second application in a form of window as a reference for input information of the second application, and thereby to meet the user needs.

In some embodiments, during the window corresponding to the first application is displayed on the current interface of the electronic device, the operation acting on the application installed in the electronic device can be detected. When the second operation of triggering the startup of the second application is detected, the interface of the second application can be generated and displayed on the current interface in response to the second operation, the window corresponding to the first application is displayed on the interface of the second application in the floating manner, and a display position of the window corresponding to the first application on the interface of the second application is not limited here. The second operation can be set in advance and stored locally in the electronic device, and the second operation is used as a judgment basis of an operation of triggering the startup of the second application. Therefore, in this embodiment, when the operation of triggering the startup of the second application is detected, it can be judged whether the operation of triggering the startup of the second application is the second operation, when the judgment result indicates that the operation of triggering the startup of the second application is the second operation, the interface of the second application can be generated and displayed on the current interface in response to the second operation, and the window corresponding to the first application can be floatingly displayed on the interface of the second application. When the judgment result indicates that the operation of triggering the startup of the second application is not the second operation, it cannot response to the operation.

In some embodiments, the second operation may include a click operation acting on an application icon corresponding to the second application, a click operation acting on the window corresponding to the second application in the multi-task interface, a click operation acting on a link corresponding to the second application, and a voice instructing the startup of the second application, which is not limited here.

Figure 4:
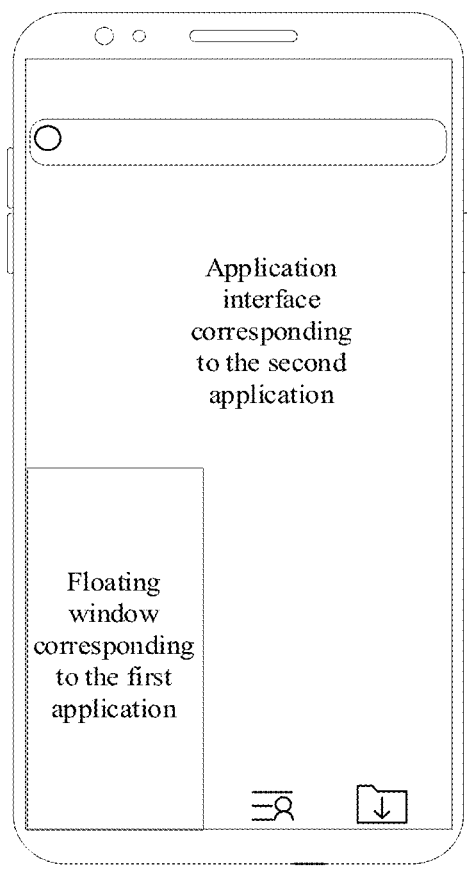
FIG. 4 illustrates a schematic view of still another interface of the electronic device according to an embodiment of the present disclosure.

Please refer to FIG. 4, which illustrates a schematic view of still another interface of the electronic device according to an embodiment of the present disclosure. As illustrated in FIG. 4, the current interface of the electronic device displays the interface of the second application, and the window corresponding to the first application is displayed on the interface of the second application in a floating manner. In FIG. 4, the window corresponding to the first application is displayed at a lower left corner of the interface of the second application. In other embodiments, the window corresponding to the first application can be displayed at a lower right corner, an upper left corner, an upper right corner, a middle area, etc. of the interface of the second application, which is not limited here.

In the multi-task operation method provided by the embodiment of the present disclosure, the multi-task interface is displayed on the current interface of the electronic device, the multi-task interface is configured to display the at least one window corresponding to the at least one application, the at least one application includes the first application, the window corresponding to the first application is displayed on the current interface in the floating manner in response to the first operation acting on the window corresponding to the first application, the interface of the second application is displayed on the current interface in response to the second operation of triggering the startup of the second application, and the window corresponding to the first application is displayed on the interface of the second application in the floating manner. Thus, through the first operation acting on the window of the first application in the multi-task interface and the second operation of triggering the startup of the second application, the interface of the second application is displayed on the current interface, and the window corresponding to the first application is displayed on the interface of the second application in the floating manner, and thereby to quickly display other windows on a window in a floating manner to meet the user needs.

Figure 5:
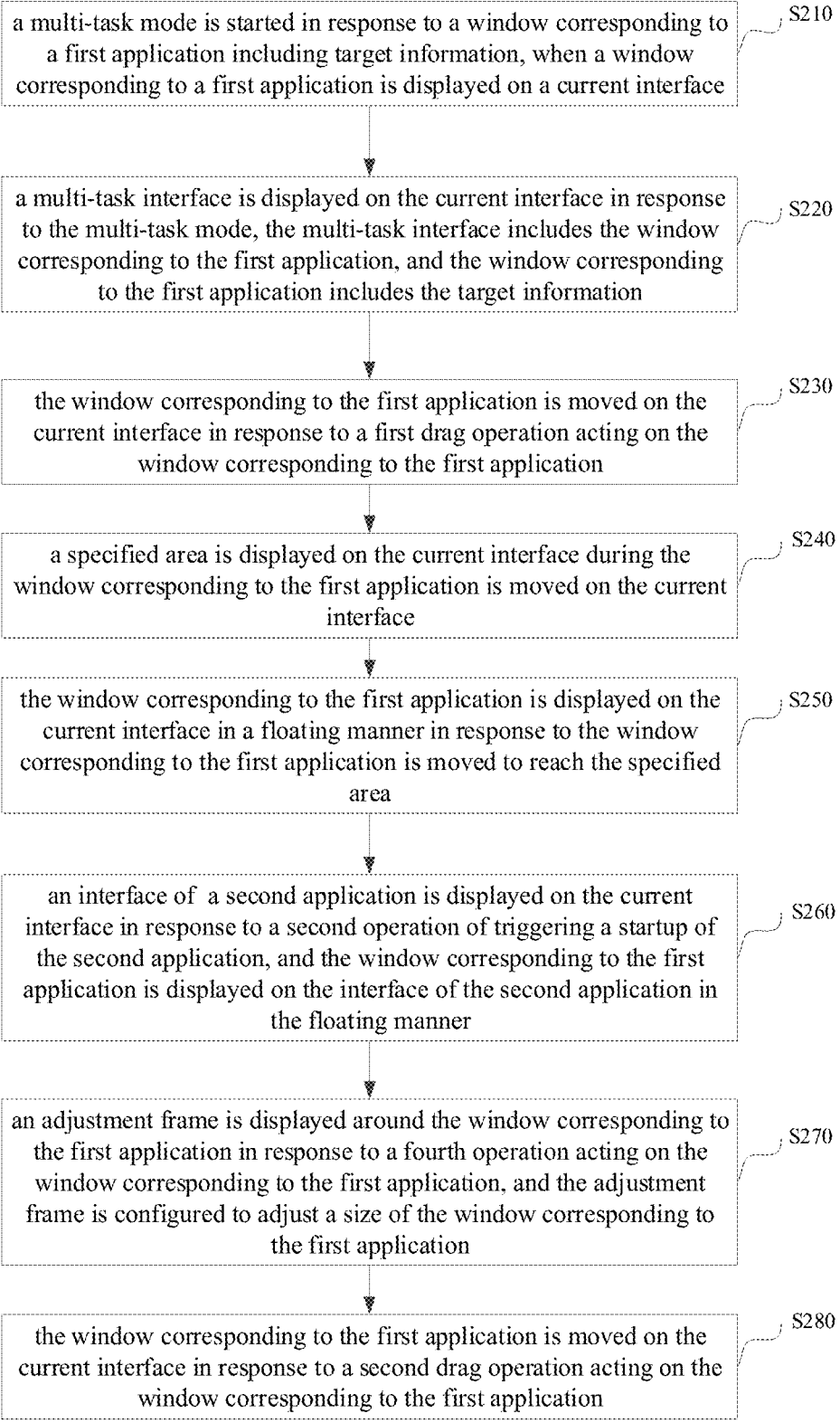
FIG. 5 illustrates a schematic flowchart of a multi-task operation method according to another embodiment of the present disclosure.

Please refer to FIG. 5, which illustrates a schematic flowchart of a multi-task operation method according to another embodiment of the present disclosure. The method is implemented by the above electronic device, and the process illustrated in FIG. 5 will be described in detail below. In this embodiment, a first operation includes a first drag operation, and the multi-task operation method can begin from block S210 to block S280.

At the block S210, a multi-task mode is started in response to a window corresponding to a first application including target information, when a window corresponding to a first application is displayed on a current interface.

In this embodiment, the electronic device can display a window (such as application interface) corresponding to an application through the current interface for users to browse or operate. When the current interface of the electronic device displays the window corresponding to the first application including the target information, the multi-task mode can be started. As a way, when the electronic device displays a window corresponding to an application through the current interface, if the window corresponding to the application includes the target information, the application can be determined as the first application and the multi-task mode can be started.

In some embodiments, when the window corresponding to the first application is displayed on the current interface, if the window corresponding to the first application includes the target information, the multi-task mode can be automatically started. In some embodiments, when the window corresponding to the first application is displayed on the current interface, if the window corresponding to the first application includes the target information, it can monitor whether an instruction instructing to start the multi-task mode is received. If a sliding operation acting on a touch screen and meeting a preset condition is detected, it is determined to that the instruction instructing to start the multi-task mode is monitored, and the multi-task mode is started.

For example, when the electronic device displays a window corresponding to a chat application through the current interface, if the window corresponding to the chat application includes a string of numbers, characters, etc. that need to be inputted in the second application, the chat application can be determined as the first application and the multi-task mode can be started automatically or manually.

At the block S220, a multi-task interface is displayed on the current interface in response to the multi-task mode, the multi-task interface includes the window corresponding to the first application, and the window corresponding to the first application includes the target information.

In some embodiments, when receiving a start instruction indicating the multi-task mode, the multi-task interface can be displayed on the current interface in response to the start instruction of the multi-task mode. It can be understood that at this time, the multi-task interface includes at least the window corresponding to the first application, and the window corresponding to the first application is a window corresponding to the first application before entering the multi-task mode. Therefore, the window corresponding to the first application includes the target information.

At the block S230, the window corresponding to the first application is moved on the current interface in response to a first drag operation acting on the window corresponding to the first application.

In this embodiment, the first operation may include the first drag operation. In some embodiments, during the multi-task interface is displayed on the current interface of the electronic device, an operation acting on the at least one window corresponding to the at least one application displayed in the multi-task interface can be detected, when the first drag operation acting on the window corresponding to the first application is detected, the window corresponding to the first application can be moved on the current interface in response to the first drag operation acting on the window corresponding to the first application. In some embodiments, a drag position of the first drag operation acting on the window corresponding to the first application can be a specified position on the window corresponding to the first application. Of course, the drag position can also include other positions, which are not limited here.

Figure 6:
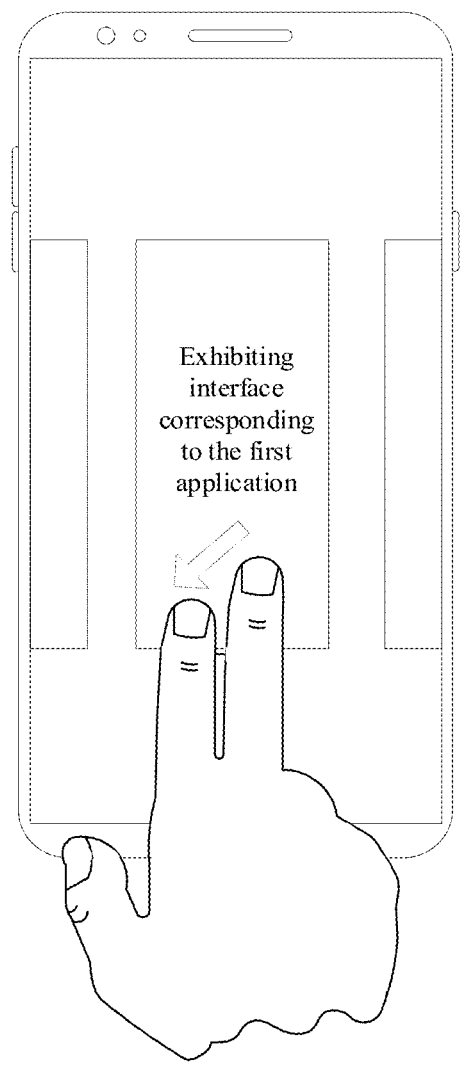
FIG. 6 illustrates a schematic view of further another interface of the electronic device according to an embodiment of the present disclosure.

Please refer to FIG. 6, which illustrates a schematic view of further another interface of the electronic device according to an embodiment of the present disclosure. As illustrated in FIG. 6, the window corresponding to the first application can be moved on the current interface based on the first drag operation.

Figure 7:
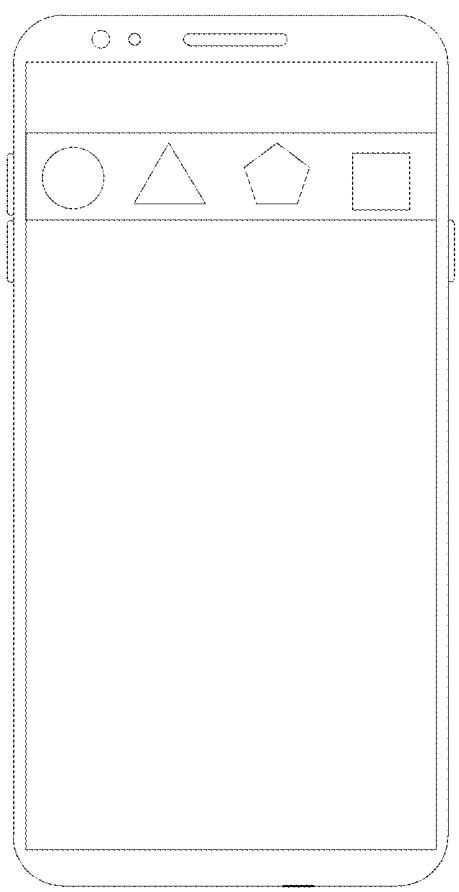
FIG. 7 illustrates a schematic view of even another interface of the electronic device according to an embodiment of the present disclosure.

In some embodiments, when the window corresponding to the first application is displayed on the current interface of the electronic device, an operation acting on the electronic device can be detected. When an operation acting on the electronic device, configured to instruct to pull down a notification bar is detected, the notification bar is displayed on the current interface of the electronic device in response to the operation instructing to pull down the notification bar, and an identification corresponding to the first application is displayed in the notification bar. An operation acting on the identification corresponding to the first application can be detected, when a click operation acting on the identification corresponding to the first application is detected, the window corresponding to the first application can be displayed on the current interface of the electronic device in the floating manner in response to the click operation acting on the identification corresponding to the first application. Please refer to FIG. 7, which illustrates a schematic view of even another interface of the electronic device according to an embodiment of the present disclosure. As illustrated in FIG. 7, the electronic device can display an identification corresponding to the first application in a notification bar, such as an identification corresponding to a triangle illustrated in FIG. 7. If a click operation acting on the identification corresponding to the triangle is detected, the window corresponding to the first application can be displayed on the current interface of the electronic device in the floating manner (as illustrated in FIG. 3).

In some embodiments, content displayed in a notification bar of the electronic device may include fixed display content and variable display content. The fixed display content refers to that content displayed on the current interface of the electronic device does not affect the display of the fixed display content in the notification bar. For example, the fixed display content may include a switch identification of a wireless network, a switch identification of a data network, a vertical screen lock switch identification, a Bluetooth switch identification, etc. The variable display content refers to the content displayed on the current interface of the electronic device, which affects the display of the variable display content in the notification bar. For example, when the current interface of the electronic device displays the window corresponding to the first application, the variable display content can be the identification corresponding to the first application. The variable display content can be displayed as a space or be no displayed when the current interface of the electronic device displays a system desktop or a lock screen interface.

Figure 8:
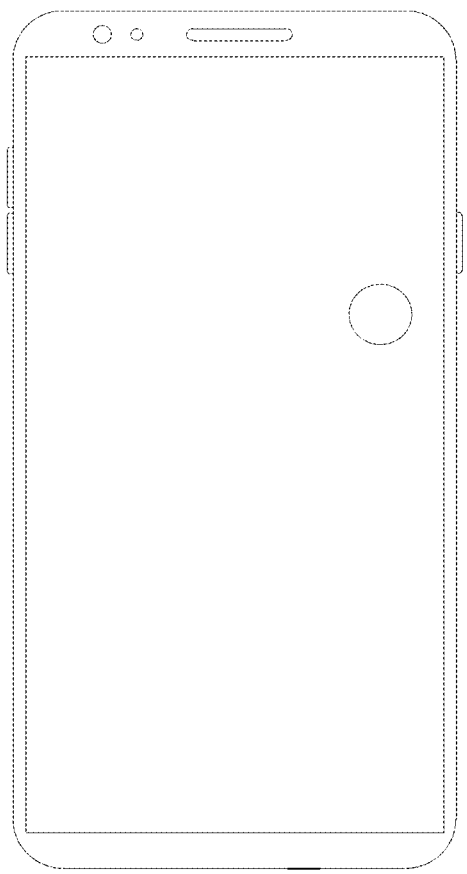
FIG. 8 illustrates a schematic view of further still another interface of the electronic device according to an embodiment of the present disclosure.

In some embodiments, a corresponding relationship between a window corresponding to an application and a floating control can be established in advance, the floating control can be displayed on the current interface of the electronic device in a floating manner, and when the floating control is floatingly displayed on the current interface of the electronic device, it can be filled with color display, translucent display, etc., which is not limited here. In this embodiment, during the floating control is displayed on the current interface of the electronic device, an operation acting on the floating control can be detected. When a click operation acting on the floating control is detected, the window corresponding to the application corresponding to the floating control can be floatingly displayed on the current interface of the electronic device in response to the click operation acting on the floating control. For example, a floating control can be the window corresponding to the first application. When a click operation acting on the floating control is detected, the window corresponding to the first application can be displayed in the current interface. Please refer to FIG. 8, which illustrates a schematic view of further still another interface of the electronic device according to an embodiment of the present disclosure. As illustrated in FIG. 8, the electronic device can display the floating control corresponding to the first application on the current interface, such as a floating control corresponding to a circle illustrated in FIG. 8. If a click operation acting on the floating control corresponding to the circle is detected, the window corresponding to the first application can be floatingly displayed on the current interface of the electronic device (as shown in FIG. 3).

At the block S240, a specified area (i.e., first area) is displayed on the current interface during the window corresponding to the first application is moved on the current interface.

In this embodiment, during the window corresponding to the first application is moved on the current interface, the specified area can be displayed on the current interface to prompt the user to move the window corresponding to the first application to a specified position. A position and a size of the specified area can be determined in advance or changed as needed, which is not limited here.

Please refer to FIG. 9, which illustrates a schematic view of even still another interface of the electronic device according to an embodiment of the present disclosure. As illustrated in FIG. 9, during the window corresponding to the first application is moved on the current interface, the specified area is displayed on the current interface, that is, an area corresponding to the "floating window" illustrated in FIG. 9, and thereby to instruct the user to drag the window corresponding to the first application to the area corresponding to the "floating window".

Refer to FIG. 10, which illustrates a schematic flowchart of the block S240 of the multi-task operation method illustrated in FIG. 5 according to an embodiment of the present disclosure. The process illustrated in FIG. 10 will be described in detail below. The method can begin from block S241 to block S242.

At the block S241, a moving direction and a moving distance of the window corresponding to the first application are obtained during the window corresponding to the first application is moved on the current interface.

In this embodiment, during the window corresponding to the first application is moved on the current interface, the moving direction of the window corresponding to the first application and the moving distance of the window corresponding to the first application can be obtained. In some embodiments, during the window corresponding to the first application is driven to move on the current interface through the first drag operation, a drag direction corresponding to the first drag operation can be detected through the touch screen, the drag distance corresponding to the first drag operation can be detected through the touch screen, the detected drag direction corresponding to the first drag operation can be determined as the moving direction of the window corresponding to the first application, the detected drag distance corresponding to the first drag operation can be determined as the moving distance of the window of the first application. For example, a capacitance sensor disposed on the touch screen can detect the drag distance corresponding to the first drag operation as the moving distance of the window of the first application, and the capacitance sensor disposed on the touch screen can detect the drag direction corresponding to the first drag operation as the moving direction of the window of the first application.

At the block S242, the specified area is displayed on the current interface in response to the moving direction and the moving distance of the window corresponding to the first application meet specified conditions.

In some embodiments, the electronic device can set in advance and store the specified conditions, which are used as judgment basis of a moving direction and a moving distance of the window corresponding to the first application. Therefore, after the moving direction and the moving distance of the window corresponding to the first application are obtained, the moving direction and the moving distance of the window corresponding to the first application can be compared with the specified conditions to judge whether the moving direction and the moving distance of the window corresponding to the first application meet the specified conditions, when the judgment results indicate that the moving direction and the moving distance of the window corresponding to the first application meet the specified conditions, it indicates that the user expects to generate the window corresponding to the first application and the specified area can be displayed on the current interface. When the judgment results indicate that the moving direction and the moving distance of the window corresponding to the first application do not meet the specified conditions, it indicates that the user performs other operations, and the specified area cannot be displayed on the current interface.

In some embodiments, the specified conditions may include a specified direction and a specified distance. Therefore, after the moving direction of the window corresponding to the first application and the moving distance of the window corresponding to the first application are obtained, the moving direction of the window corresponding to the first application can be compared with the specified direction to judge whether the moving direction of the window corresponding to the first application meets the specified direction, and the moving distance of the window corresponding to the first application can be compared with the specified distance to judge whether the moving distance of the window of the first application meets the specified distance. When the moving direction of the window of the first application meets the specified direction and the moving distance of the window of the first application meets the specified distance, it can be determined that the moving direction and the moving distance of the first application meet the specified conditions, and the specified area can be displayed on the current interface, when the moving direction of the window of the first application does not meet the specified direction and/or the moving distance of the window of the first application does not meet the specified distance, it can be determined that the moving direction and the moving distance of the first application do not meet the specified conditions, and the specified area is not displayed on the current interface.

At the block S250, the window corresponding to the first application is displayed on the current interface in a floating manner in response to the window corresponding to the first application is moved to the specified area.

In this embodiment, when the window corresponding to the first application is moved to the specified area, the window corresponding to the first application can be generated and floatingly displayed on the current interface. In some embodiments, when any area of the window corresponding to the first application is moved to the specified area, the window corresponding to the first application can be generated and floatingly displayed on the current interface, or when a half area of the window corresponding to the first application is moved to the specified area, the window corresponding to the first application can be generated and floatingly displayed on the current interface, or when all area of the window corresponding to the first application is moved to the specified area, the window corresponding to the first application can be generated and floatingly displayed on the current interface.

Figures 11, 12:
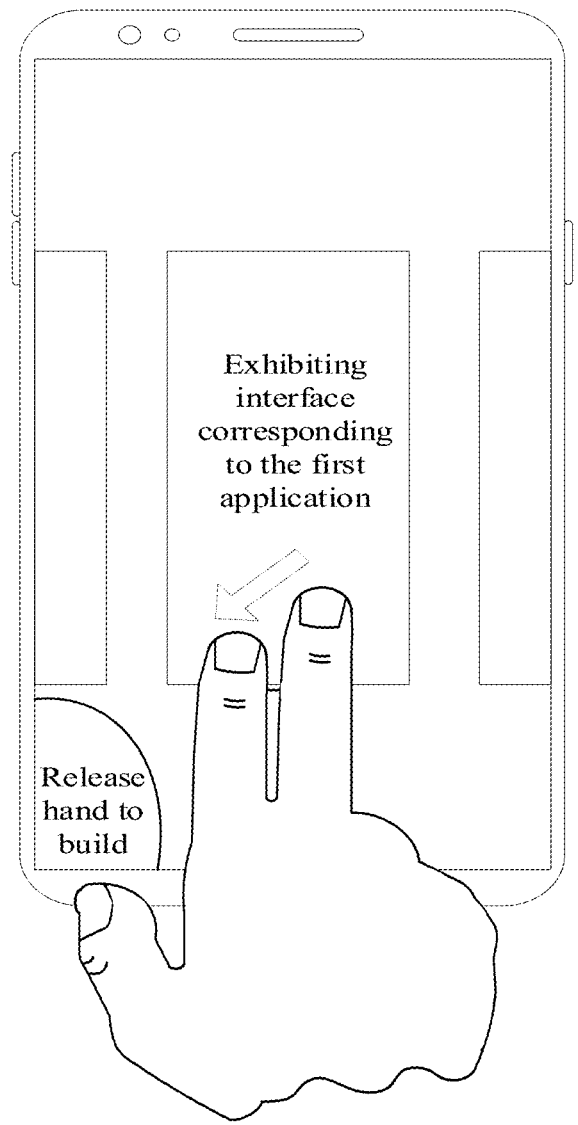
FIG. 11 illustrates a schematic flowchart of block S250 of the multi-task operation method illustrated in FIG. 5 according to an embodiment of the present disclosure.
FIG. 12 illustrates a schematic view of still further another interface of the electronic device according to an embodiment of the present disclosure.

Refer to FIG. 11, which illustrates a schematic flowchart of the block S250 of the multi-task operation method illustrated in FIG. 5 according to an embodiment of the present disclosure. The process illustrated in FIG. 11 will be described in detail below. The method can begin from block S251 to block S252.

At the block S251, a specified prompt is displayed in the specified area in response to the window corresponding to the first application is moved to the specified area.

In this embodiment, when the window corresponding to the first application is moved to the specified area, the specified prompt can be displayed in the specified area to remind the user to build the window corresponding to the first application according to the prompt. In some embodiments, the specified prompt can be a text prompt, a color prompt, a picture prompt, etc., which is not limited here.

Please refer to FIG. 12, which illustrates a schematic view of still further another interface of the electronic device according to an embodiment of the present disclosure. As shown in FIG. 12, when the window corresponding to the first application is moved to the specified area, a specified prompt, that is, a prompt of "Release hand to build" illustrated in FIG. 12, is displayed in the specified area, and thereby to remind the user to release his hand to build the window corresponding to the first application.

At the block S252, the window corresponding to the first application is displayed on the current interface in the floating manner in response to a third operation corresponding to the specified prompt is detected.

In some embodiments, during the specified prompt is displayed in the specified area, an operation acting on the electronic device can be detected. When the third operation corresponding to the specified prompt is detected, the window corresponding to the first application can be built and generated, and the window corresponding to the first application can be floatingly displayed on the current interface. The third operation can be set in advance and stored locally in the electronic device. The third operation is used as a judgment basis for an operation acting on the electronic device, therefore, in this embodiment, when the operation acting on the electronic device is detected, it can be judged whether the operation acting on the electronic device is the third operation. When the judgment result indicates that the operation acting on the electronic device is the third operation, the window corresponding to the first application can be floatingly displayed on the current interface in response to the operation acting on the electronic device. When the judgment result indicates that the operation acting on the electronic device is not the third operation, it may not response to the operation.

For example, the third operation is a raising operation. After the window corresponding to the first application is moved to the specified area, if the raising operation (release hand) is detected, the window corresponding to the first application is displayed on the current interface.

At the block S260, an interface of a second application is displayed on the current interface in response to a second operation of triggering a startup of the second application, and the window corresponding to the first application is displayed on the interface of the second application in the floating manner.

For the specific description of the block S260, please refer to the block S130, which will not be repeated here.

Please refer to FIG. 13A, which illustrates a schematic flowchart of the block S260 of the multi-task operation method illustrated in FIG. 5 according to an embodiment of the present disclosure. The process illustrated in FIG. 13A will be described in detail below. The method can include block S261.

At the block S261, the interface of the second application is displayed on the current interface in response to a click operation acting on an application icon corresponding to the second application, and the window corresponding to the first application is displayed on the interface of the second application in the floating manner.

In some embodiments, when the current interface displays the window corresponding to the first application, the electronic device can automatically exit the multi-task interface and enter a system desktop, or the electronic device can exit the multi-task interface and enter the system desktop based on an operation instruction triggered by the user. At this time, application icons corresponding to applications are displayed on the system desktop, the applications include the second application.

In this embodiment, the operation acting on the application icon corresponding to the second application can be detected. When the click operation acting on the application icon corresponding to the second application is detected, the interface corresponding to the second application can be displayed on the current interface in response to the click operation acting on the application icon corresponding to the second application, the window corresponding to the first application is floatingly displayed on the interface of the second application.

Please refer to FIG. 13B, which illustrates another schematic flowchart of the block S260 of the multi-task operation method illustrated in FIG. 5 according to an embodiment of the present disclosure. The process illustrated in FIG. 13B will be described in detail below. The method can include block S262.

At the block S262, the interface of the second application is displayed on the current interface in response to a click operation acting on the window corresponding to the second application, and the window corresponding to the first application is displayed on the interface of the second application in the floating manner.

In some embodiments, when the current interface displays the window corresponding to the first application, the electronic device can remain in the multi-task interface. In this embodiment, the operation acting on the window corresponding to the second application can be detected. When the click operation acting on the window corresponding to the second application is detected, the interface of the second application can be displayed on the current interface in response to the click operation acting on the window corresponding to the second application, and the window corresponding to the first application can be floatingly displayed on the interface of the second application.

At the block S270, an adjustment frame is displayed around the window corresponding to the first application in response to a fourth operation acting on the window corresponding to the first application, and the adjustment frame is configured to adjust a size of the window corresponding to the first application.

In some embodiments, the window corresponding to the first application can be operated during the window corresponding to the first application is displayed on the current interface and during the window corresponding to the first application is floatingly displayed on the interface of the second application. Therefore, in this embodiment, during the window corresponding to the first application is displayed on the current interface and during the window corresponding to the first application is floatingly displayed on the interface of the second application, an operation acting on the window corresponding to the first application can be detected. When the fourth operation acting on the window corresponding to the first application is detected, an adjustment frame can be generated and displayed around the window corresponding to the first application, in which the adjustment frame is configured to adjust the size of the window corresponding to the first application, that is, the user can increase or decrease the size of the window corresponding to the first application by operating the adjustment frame.

The fourth operation can be set in advance and stored locally in the electronic device, and the fourth operation is used as a judgment basis for an operation acting on the window corresponding to the first application. Therefore, in this embodiment, when the operation acting on the window corresponding to the first application is detected, it can be judged whether the operation acting on the window corresponding to the first application is the fourth operation, when the judgment result indicates that the operation acting on the window corresponding to the first application is the fourth operation, an adjustment frame can be generated and displayed around the window in response to the operation acting on the window corresponding to the first application. When the judgment result indicates that the operation acting on the window corresponding to the first application is not the fourth operation, it cannot response to the operation.

In some embodiments, when the fourth operation acting on the window corresponding to the first application is detected, a deletion control can be generated on the window corresponding to the first application, which is configured to delete the window corresponding to the first application.

In some embodiments, the fourth operation may include a click operation. That is, when the click operation acting on the window corresponding to the first application is detected, an adjustment frame can be generated and displayed on the window corresponding to the first application.

Please refer to FIG. 14, which illustrates a schematic view of even further another interface of the electronic device according to an embodiment of the present disclosure. As illustrated in FIG. 14, when the fourth operation acting on the window corresponding to the first application is detected, an adjustment frame is generated and displayed around the window corresponding to the first application, and a deletion control is generated and displayed.

At the block S280, the window corresponding to the first application is moved on the current interface in response to a second drag operation acting on the window corresponding to the first application.

In some embodiments, the window corresponding to the first application can be dragged during the window corresponding to the first application is displayed on the current interface and during the window corresponding to the first application is displayed on the interface of the second application in the floating manner. Therefore, in this embodiment, during the window corresponding to the first application is displayed on the current interface and the window corresponding to the first application is floatingly displayed on the interface of the second application, if the second drag operation acting on the window is detected, the window can be moved according to the second drag operation on the current interface.

Figure 15:
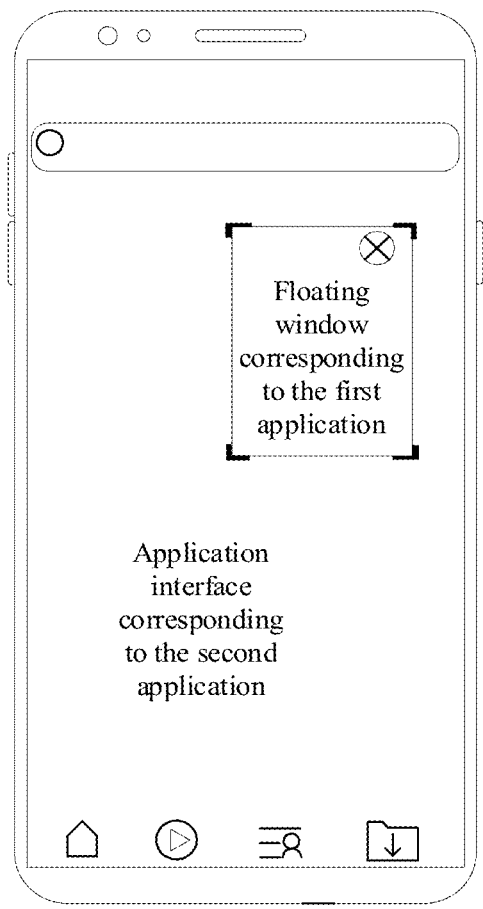
FIG. 15 illustrates a schematic view of further even still another interface of the electronic device according to an embodiment of the present disclosure.

Please refer to FIG. 15, which illustrates a schematic view of further even still another interface of the electronic device according to an embodiment of the present disclosure. The window corresponding to the first application can be moved from a position illustrated in FIG. 14 to a position illustrated in FIG. 15 according to the second drag operation.

In the multi-task operation method provided by another embodiment of the present disclosure, the multi-task mode can be started in response to the window corresponding to the first application includes the target information, when the window corresponding to the first application is displayed on the current interface, the multi-task interface can be displayed on the current interface in response to the multi-task mode, the multi-task interface includes the window corresponding to the first application, the window corresponding to the first application includes the target information, the window corresponding to the first application can be moved on the current interface in response to the first drag operation acting on the window corresponding to the first application, the specified area can be displayed on the current interface during the window corresponding to the first application is moved on the current interface, the window corresponding to the first application can be displayed on the current interface in the floating manner in response to the window corresponding to the first application is moved to the specified area, the interface of the second application can be displayed on the current interface in response to the second operation triggered by the user indicating the startup of the second application, and the window corresponding to the first application is displayed on the interface of the second application in the floating manner. Compared with the multi-task operation method illustrated in FIG. 1, in this embodiment, the multi-task mode is started to display the multi-task interface when the window corresponding to the first application includes the target information, and thereby to make the display of the multi-task interface more meet the user needs. In addition, in this embodiment, the specified area is displayed during the moving of the window corresponding to the first application to instruct the user to move the window to improve the efficiency of multi-task operations.

Figure 16:
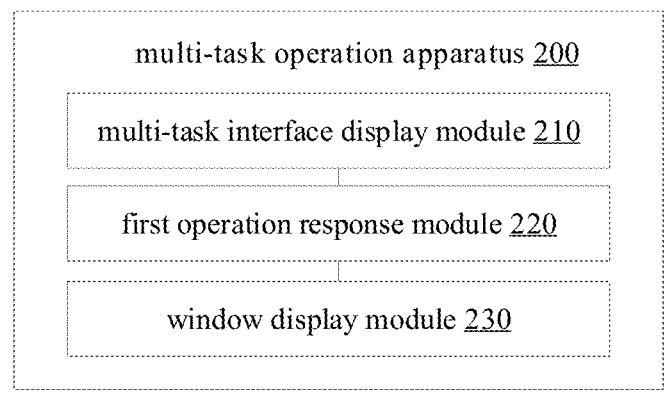
FIG. 16 illustrates a schematic block diagram of a multi-task operation apparatus according to an embodiment of the present disclosure.
Figure 17:
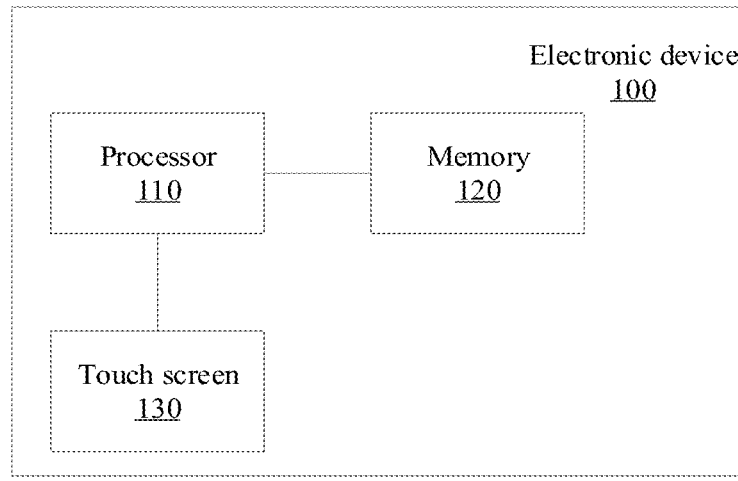
FIG. 17 illustrates a schematic block diagram of an electronic device for implementing the multi-task operation method of any one of illustrated embodiments of the present disclosure, according to an embodiment of the present disclosure.

Please refer to FIG. 16, which illustrates a schematic block diagram of a multi-task operation apparatus 200 according to an embodiment of the present disclosure. The multi-task operation apparatus 200 is applied to the above electronic device. The block diagram illustrated in FIG. 16 will be described below. The multi-task operation apparatus 200 may include a multi-task interface display module 210, a first operation response module 220 and a window display module 230.

The multi-task interface display module 210 is configured to display a multi-task interface on a current interface of the electronic device, the multi-task interface being configured to display at least one window corresponding to at least one application, and the at least one application including a first application.

In an illustrated embodiment, the multi-task interface display module 210 include a multi-task mode startup submodule and a multi-task interface display submodule.

The multi-task mode startup submodule is configured to start, in response to the window corresponding to the first application including target information, a multi-task mode, when the window corresponding to the first application is displayed on the current interface.

The multi-task interface display submodule is configured to display, in response to the multi-task mode, the multi-task interface on the current interface, the multi-task interface including the window corresponding to the first application, and the window corresponding to the first application including the target information.

The first operation response module 220 is configured to display, in response to a first operation acting on the window corresponding to the first application, the window corresponding to the first application on the current interface in a floating manner.

In an illustrated embodiment, the first operation includes a first drag operation, and the first operation response module 220 may include a window moving submodule and a window display submodule.

The window moving submodule is configured to move, in response to the first drag operation acting on the window corresponding to the first application, the window corresponding to the first application on the current interface.

The window display submodule is configured to display, in response to the window corresponding to the first application is moved to a specified area, the window corresponding to the first application on the current interface in the floating manner.

In an illustrated embodiment, the window display submodule may include a specified prompt display unit and a window display unit.

The specified prompt display unit is configured to display, in response to the window corresponding to the first application is moved to the specified area, a specified prompt in the specified area.

The window display unit is configured to display, in response to a third operation corresponding to the specified prompt is detected, the window corresponding to the first application on the current interface in the floating manner.

In an illustrated embodiment, the window display module may include a specified area display submodule.

The specified area display submodule is configured to display the specified area on the current interface during the window corresponding to the first application is moved on the current interface.

In an illustrated embodiment, the specified area display submodule may include a moving feature obtaining unit and a specified area displaying unit.

The moving feature obtaining unit is configured to obtain a moving direction and a moving distance of the window corresponding to the first application during the window corresponding to the first application is moved on the current interface.

The specified area displaying unit is configured to display, in response to the moving direction and the moving distance of the window corresponding to the first application meet specified conditions, the specified area on the current interface.

The window display module 230 is configured to display, in response to a second operation configured to trigger a startup of the second application, the interface of the second application on the current interface, and the window corresponding to the first application is displayed on the interface of the second application in the floating manner.

In an illustrated embodiment, the window display module 230 may include a first window display submodule and a second window display submodule.

The first window display submodule is configured to display, in response to a click operation acting on an application icon corresponding to the second application, the interface of the second application on the current interface, and the window corresponding to the first application is floatingly displayed on the interface of the second application.

The second window display submodule is configured to display, in response to a click operation acting on the window corresponding to the second application, the interface of the second application on the current interface, and the window corresponding to the first application is floatingly displayed on the interface of the second application.

In an illustrated embodiment, the multi-task operation apparatus 200 may include a window adjustment module.

The window adjustment module is configured to display, in response to a fourth operation acting on the window corresponding to the first application, an adjustment frame around the window corresponding to the first application, and the adjustment frame is configured to adjust a size of the window corresponding to the first application.

In an illustrated embodiment, the multi-task operation apparatus 200 may include a window moving module.

The window moving module is configured to move the window corresponding to the first application on the current interface in response to a second drag operation acting on the window corresponding to the first application.

Those skilled in the art can clearly understand that for the convenience and simplicity of description, the specific working process of the above-described apparatus and module can refer to the corresponding process in the above method embodiments, which will not be repeated here.

In several embodiments provided in the present disclosure, the coupling between modules can be electrical, mechanical, or other forms of coupling.

In addition, each functional module in each embodiment of the present disclosure can be integrated into one processing module, each module can exist separately, or two or more modules can be integrated into one module. The above integrated modules can be realized in the form of hardware or software function modules.

Please refer to FIG. 17, which illustrates a schematic block diagram of an electronic device 100 according to an embodiment of the present disclosure. The electronic device 100 may be an electronic device capable of running instructions such as a smartphone, a tablet computer, an e-book, etc. The electronic device 100 in the present disclosure may include one or more of the following components: a processor 110, a memory 120, a touch screen 130, and one or more instructions, the one or more instructions may be stored in the memory 120 and configured to be executed by one or more processors 110, and the one or more instructions are configured to implement the method described in the above method embodiments.

The processor 110 may include one or more processing cores. The processor 110 uses various interfaces and lines to connect to various parts of the entire electronic device 100, and executes various functions of the electronic device 100 and processes data by running or executing instructions, programs, code sets or instruction sets stored in the memory 120 and retrieving data stored in the memory 120. In at least one illustrated embodiment, the processor 110 may be implemented by at least one hardware form of a Digital Signal Processing (DSP), a Field-Programmable Gate Array (FPGA) and a Programmable Logic Array (PLA). The processor 110 may be integrated with one or any combination of a Central Processing Unit (CPU), a Graphics processing Unit (GPU) and a modem. The CPU mainly processes an operating system, a user interface, applications and so on. The GPU is configured to render and draw a content to be displayed. The modem is configured to process wireless communication. It can be understood that the above modem may not be integrated into the processor 110, but may be implemented by a chip alone.

The memory 120 may include a Random-Access Memory (RAM) or may include a Read-Only Memory. The memory 120 may be configured to store instructions, programs, codes, code sets, or instruction sets. The memory 120 may include a program storage region and a data storage region. The program storage region may store instructions for implementing the operating system, instructions for at least one function (such as a touch function, a sound playback function, an image playback function, etc.), instructions used to implement the following method embodiments, etc. The data storage region can store data (such as phonebook, audio and video data, chat record data) created by the electronic device 100 in use.

The touch screen 130 is configured to display information inputted by the user, information provided to the user and various graphical user interfaces of the electronic device 100. These graphical user interfaces can be composed of graphics, text, icons, numbers, video, and any combination thereof. For example, the touch screen 130 can be a liquid crystal display (LCD), or can be organic light emitting diode (OLED), which is not limited here.

Figure 18:
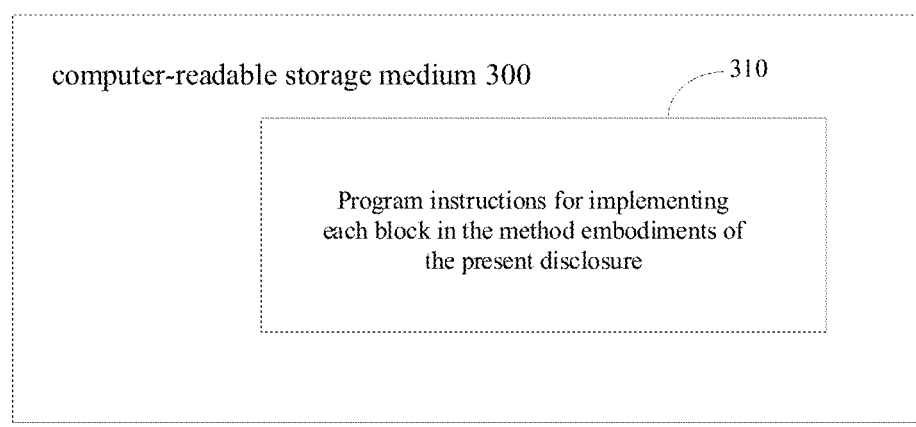
FIG. 18 illustrates a schematic block diagram of a computer-readable storage medium for storing or carrying program instructions of implementing the multi-task operation method of any one of illustrated embodiments of the present disclosure, according to an embodiment of the present disclosure.

Please refer to FIG. 18, which illustrates a schematic block diagram of a computer-readable storage medium according to an embodiment of the present disclosure. The computer-readable storage medium 300 is stored with program instructions that can be callable by a processor to implement the method described in the above method embodiments.

The computer-readable storage medium 300 may be an electronic memory such as a flash memory, an Electrically Erasable Programmable Read Only Memory (EEPROM), an Erasable Programmable Read Only Memory (EPROM), a hard disk, or a Read Only Memory (ROM). In at least one illustrated embodiment, the computer-readable storage medium 300 includes a non-transitory computer-readable storage medium. The computer-readable storage medium 300 has a storage space for the program instructions 310 configured to implement any method steps described in the above embodiments. These program instructions 310 can be read from or written into one or more computer program products. The program instructions 310 may be compressed, for example, in an appropriate form.

To sum up, the multi-task operation method, the multi-task operation apparatus, electronic device, and storage medium are provided by the embodiments of the present disclosure, the multi-task interface is displayed on the current interface of the electronic device, the multi-task interface is configured to display the at least one window corresponding to the at least one application, the at least one application includes the first application, the window corresponding to the first application is displayed on the current interface in the floating manner in response to the first operation acting on the window corresponding to the first application, the interface of the second application is displayed on the current interface in response to the second operation configured to trigger the startup of the second application, and the window corresponding to the first application is displayed on the interface of the second application in the floating manner, through the first operation acting on the window corresponding to the first application in the multi-task interface, and the second operation configured to trigger the startup of the second application, the interface of the second application is displayed on the current interface, and the window corresponding to the first application is displayed on the interface of the second application in the floating manner, and thereby to quickly display other windows on a window in a floating manner to meet the user needs.

Finally, it should be noted that the above embodiments are only used to illustrate the technical solutions of the present disclosure, but not intended to limit the present disclosure. Although the present disclosure has been described in detail with reference to the foregoing embodiments, it should understand that those of original skill in the art can still amend the technical solutions recorded in the foregoing embodiments or equivalently replace some of the technical features. These amendments or replacements do not make the essence of the corresponding technical solutions deviate from the spirit and scope of the technical solutions of the embodiments of the present disclosure.

What is claimed is:

1. A multi-task operation method, implemented by an electronic device, comprising:
    displaying a multi-task interface on a current interface of the electronic device, the multi-task interface comprising windows corresponding to applications running in background, the multi-task interface being configured to display at least one of the windows corresponding to at least one of the applications, and the at least one of the applications comprising a first application;
    displaying, in response to a first operation acting on a window corresponding to the first application, the window corresponding to the first application in a floating manner on the multi-task interface or a system interface of the electronic device; and
    in response to a second operation of triggering a startup of a second application being performed on the multi-task interface or the system interface on which the window corresponding to the first application is being displayed in the floating manner, switching the multi-task interface or the system interface to an interface of the second application on the electronic device, retaining the window corresponding to the first application displayed in the floating manner and displaying, on the interface of the second application, the retained window corresponding to the first application in the floating manner;
    wherein the first operation comprises a first drag operation; and the displaying, in response to a first operation acting on a window corresponding to the first application, the window corresponding to the first application in a floating manner, comprises:
        moving, in response to the first drag operation acting on the window corresponding to the first application, the window corresponding to the first application;
        obtaining a moving direction and a moving distance of the window corresponding to the first application when the window corresponding to the first application is being moved;
        displaying, in response to the moving direction and the moving distance of the window corresponding to the first application meet specified conditions, a first area where the window corresponding to the first application is to be displayed in the floating manner, while moving the window corresponding to the first application; and
        displaying, in response to the window corresponding to the first application is moved to the first area, the window corresponding to the first application in the floating manner.

2. The method according to claim 1, wherein the displaying, in response to the window corresponding to the first application is moved to the first area, the window corresponding to the first application in the floating manner, comprises:
    displaying, in response to the window corresponding to the first application is moved to the first area, a prompt in the first area; and
    displaying, in response to a third operation corresponding to the prompt, the window corresponding to the first application in the floating manner.

3. The method according to claim 1, wherein the specified conditions comprise a specified direction and a specified distance; and the displaying, in response to the moving direction and the moving distance of the window corresponding to the first application meet specified conditions, a first area where the window corresponding to the first application is to be displayed in the floating manner, comprises:
    displaying, in response to the moving direction of the window corresponding to the first application meets the specified direction and the moving distance of the window corresponding to the first application meets the specified distance, the first area where the window corresponding to the first application is to be displayed in the floating manner.

4. The method according to claim 1, further comprising:
    in response to an operation, configured to instruct to pull down a notification bar, acting on the electronic device, displaying the notification bar and displaying an identification corresponding to the first application in the notification bar; and
    displaying, in response to a click operation acting on the identification corresponding to the first application, the window corresponding to the first application in the floating manner.

5. The method according to claim 1, wherein the current interface of the electronic device displays a floating control, and the floating control corresponds to the window corresponding to the first application; and the method comprises:
    detecting an operation acting on the floating control; and
    when the operation acting on the floating control as detected is a click operation, displaying, in response to the click operation acting on the floating control, the window corresponding to the first application in the floating manner.

6. The method according to claim 1, wherein after the displaying, in response to a first operation acting on the window corresponding to the first application, the window corresponding to the first application, the method further comprises:
    displaying, in response to a fourth operation acting on the window corresponding to the first application, an adjustment frame around the window corresponding to the first application, wherein the adjustment frame is configured to adjust a size of the window corresponding to the first application.

7. The method according to claim 6, wherein the displaying, in response to a fourth operation acting on the window corresponding to the first application, an adjustment frame around the window corresponding to the first application, comprises:
    in response to the fourth operation acting on the window corresponding to the first application, displaying the adjustment frame around the window corresponding to the first application and displaying a deletion control on the window corresponding to the first application, wherein the deletion control is configured to delete the window corresponding to the first application.

8. The method according to claim 1, wherein after the displaying, in response to a first operation acting on the window corresponding to the first application, the window corresponding to the first application, the method further comprises:
    moving, in response to a second drag operation acting on the window corresponding to the first application, the window corresponding to the first application.

9. The method according to claim 1, wherein the displaying a multi-task interface on a current interface of the electronic device, the multi-task interface being configured to display at least one of the windows corresponding to at least one of the applications, and the at least one of the applications comprising a first application, comprises:
 starting, in response to the window corresponding to the first application comprising target information that is to be referred by the second application, a multi-task mode, when displaying the window corresponding to the first application; and
 displaying, in response to the multi-task mode, the multi-task interface; wherein the multi-task interface comprises the window corresponding to the first application, and the window corresponding to the first application comprises the target information.

10. The method according to claim 9, wherein the starting, in response to the window corresponding to the first application comprising target information that is to be referred by the second application, a multi-task mode, when displaying the window corresponding to the first application, comprises:
 monitoring, in response to the window corresponding to the first application comprising the target information that is to be referred by the second application, whether an instruction for instructing a startup of the multi-task mode is received, when displaying the window corresponding to the first application; and
 determining, in response to a sliding operation meeting a preset condition and acting on a touch screen of the electronic device is detected, the instruction for instructing the startup of the multi-task mode is monitored, and then starting the multi-task mode.

11. The method according to claim 1, wherein the displaying a multi-task interface on a current interface of the electronic device, comprises:
 displaying, in response to a sliding operation with a starting point at a bottom of a touch screen of the electronic device and with a sliding direction parallel to an axial direction of the touch screen of the electronic device is detected, the multi-task interface by the electronic device.

12. The method according to claim 1, wherein the in response to a second operation of triggering a startup of a second application being performed on the multi-task interface or the system interface on which the window corresponding to the first application is being displayed in the floating manner, switching the multi-task interface or the system interface to an interface of the second application on the electronic device, retaining the window corresponding to the first application displayed in the floating manner and displaying, on the interface of the second application, the retained window corresponding to the first application in the floating manner, comprises:
 in response to a click operation acting on an application icon corresponding to the second application displayed in the system interface to trigger the startup of the second application, switching the system interface to the interface of the second application on the electronic device, retaining the window corresponding to the first application displayed in the floating manner and displaying, on the interface of the second application, the retained window corresponding to the first application in the floating manner; or
 in response to a click operation acting on a window corresponding to the second application displayed in the multi-task interface to trigger the startup of the second application, switching the multi-task interface to the interface of the second application on the electronic device, retaining the window corresponding to the first application displayed in the floating manner and displaying, on the interface of the second application, the retained window corresponding to the first application in the floating manner.

13. The method according to claim 12, wherein before the in response to a click operation acting on an application icon corresponding to the second application displayed in the system interface to trigger the startup of the second application, switching the system interface to the interface of the second application on the electronic device, retaining the window corresponding to the first application displayed in the floating manner and displaying, on the interface of the second application, the retained window corresponding to the first application in the floating manner, the method further comprises:
 automatically exiting the multi-task interface and entering the system interface, when displaying the window corresponding to the first application in the floating manner, wherein the system interface displays application icons corresponding to a plurality of applications, and the plurality of applications comprise the second application.

14. The method according to claim 1, wherein the method further comprises:
 displaying the at least one of the windows corresponding to the at least one of the applications while hiding the windows corresponding to the others of the applications; and switching states of displaying and hiding of the windows corresponding to the applications based on a sliding operation.

15. The method according to claim 1, wherein the method further comprises:
 obtaining the application running in the background of the electronic device; and
 displaying the window corresponding to the application running in the background of the electronic device in the multi-task interface.

16. An electronic device comprising: a processor and a memory; wherein the memory is coupled to the processor, the memory is stored with instructions, and the processor is configured to, when the instructions are executed by the processor, implement a multi-task operation method; wherein the multi-task operation method comprises:
 displaying a multi-task interface on a current interface of the electronic device, the multi-task interface being configured to display at least one window corresponding to at least one application, and the at least one application comprising a first application and a second application;
 displaying, in response to a first operation acting on a window corresponding to the first application, the window corresponding to the first application in a floating manner on the multi-task interface; and
 in response to a second operation performed, on the multi-task interface, for a window corresponding to the second application to trigger a startup of the second application, switching the multi-task interface to an interface of the second application on the electronic device, retaining the window corresponding to the first application displayed in the floating manner and displaying, on the interface of the second application, the retained window corresponding to the first application in the floating manner;

wherein the first operation comprises a first drag operation; and the displaying, in response to a first operation acting on the window corresponding to the first application, the window corresponding to the first application in a floating manner, comprises:
- moving, in response to the first drag operation acting on the window corresponding to the first application, the window corresponding to the first application;
- obtaining a moving direction and a moving distance of the window corresponding to the first application when the window corresponding to the first application is being moved;
- displaying, in response to the moving direction and the moving distance of the window corresponding to the first application meet specified conditions, a first area where the window corresponding to the first application is to be displayed in the floating manner, while moving the window corresponding to the first application; and
- displaying, in response to the window corresponding to the first application is moved to the first area, the window corresponding to the first application in the floating manner.

17. A non-transitory computer-readable storage medium stored with program instructions therein, wherein the program instructions are callable by a processor to implement a multi-task operation method; wherein the multi-task operation method comprises:
- displaying a multi-task interface on a current interface of an electronic device, the multi-task interface being configured to display at least one window corresponding to at least one application, and the at least one application comprising a first application;
- displaying, in response to a first operation acting on a window corresponding to the first application, the window corresponding to the first application in a floating manner on a system interface of the electronic device, the system interface displaying application icons corresponding to a plurality of applications, and the plurality of applications comprising a second application; and
- in response to a second operation performed, on the system interface, an application icon corresponding to the second application to trigger a startup of the second application, switching the system interface to an interface of the second application on the electronic device, retaining the window corresponding to the first application displayed in the floating manner and displaying, on the interface of the second application, the retained window corresponding to the first application in the floating manner;

wherein the first operation comprises a first drag operation; and the displaying, in response to a first operation acting on the window corresponding to the first application, the window corresponding to the first application in a floating manner, comprises:
- moving, in response to the first drag operation acting on the window corresponding to the first application, the window corresponding to the first application;
- obtaining a moving direction and a moving distance of the window corresponding to the first application when the window corresponding to the first application is being moved;
- displaying, in response to the moving direction and the moving distance of the window corresponding to the first application meet specified conditions, a first area where the window corresponding to the first application is to be displayed in the floating manner, while moving the window corresponding to the first application; and
- displaying, in response to the window corresponding to the first application is moved to the first area, the window corresponding to the first application in the floating manner.

* * * * *